(12) United States Patent
Popescu et al.

(10) Patent No.: US 7,949,782 B2
(45) Date of Patent: May 24, 2011

(54) EXTENDED LINK MONITORING CHANNEL FOR 10 GB/S ETHERNET

(75) Inventors: Petre Popescu, Ottawa (CA); Daniel Pierre Trepanier, Ottawa (CA); Stanislas Wolski, Ottawa (CA); Niraj Rajendra Mathur, Ottawa (CA)

(73) Assignee: Qualcomm Incorporated, San Diego, CA (US)

( * ) Notice: Subject to any disclaimer, the term of this patent is extended or adjusted under 35 U.S.C. 154(b) by 1816 days.

(21) Appl. No.: 10/701,485

(22) Filed: Nov. 6, 2003

(65) Prior Publication Data

US 2005/0102419 A1 May 12, 2005

(51) Int. Cl.
*G06F 15/173* (2006.01)
(52) U.S. Cl. ........................................... 709/238
(58) Field of Classification Search .................. 709/238
See application file for complete search history.

(56) References Cited

U.S. PATENT DOCUMENTS

| | | | | |
|---|---|---|---|---|
| 6,618,395 | B1 * | 9/2003 | Kimmitt | 370/473 |
| 6,741,566 | B1 * | 5/2004 | Furlong et al. | 370/236 |
| 2002/0046348 | A1 * | 4/2002 | Brustoloni | 713/201 |
| 2003/0016770 | A1 * | 1/2003 | Trans et al. | 375/346 |
| 2003/0021229 | A1 * | 1/2003 | Kadambi et al. | 370/229 |

OTHER PUBLICATIONS

LAN/MAN Standards Committee of IEEE Computer Society ("P802.3ae Draft Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation", May 2002, IEEE, pp. 1-536).*
LAN/MAN Standards Committee of IEEE Computer Society, "P802.3ae Draft Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation", May 2002, IEEE, pp. 1-536.*
IEEE Draft P802.3ae/D5.0.

* cited by examiner

*Primary Examiner* — George C Neurauter, Jr.
*Assistant Examiner* — Suraj Joshi
(74) *Attorney, Agent, or Firm* — Janus T. Hagler

(57) ABSTRACT

The invention provides a method for utilizing the Inter Packet Gaps (IPGs) to create an Extended Link Monitoring Channel in a physical layer transceiver for a 10 Gb/s Ethernet link for communicating link related information, thus providing an extensive link maintenance capability. A corresponding transceiver between an Ethernet media access control (MAC) layer device and a 10 Gb/s Ethernet link, comprising a physical coding sublayer (PCS) extension circuit for implementing the Extended Link Monitoring Channel is also provided.

31 Claims, 9 Drawing Sheets

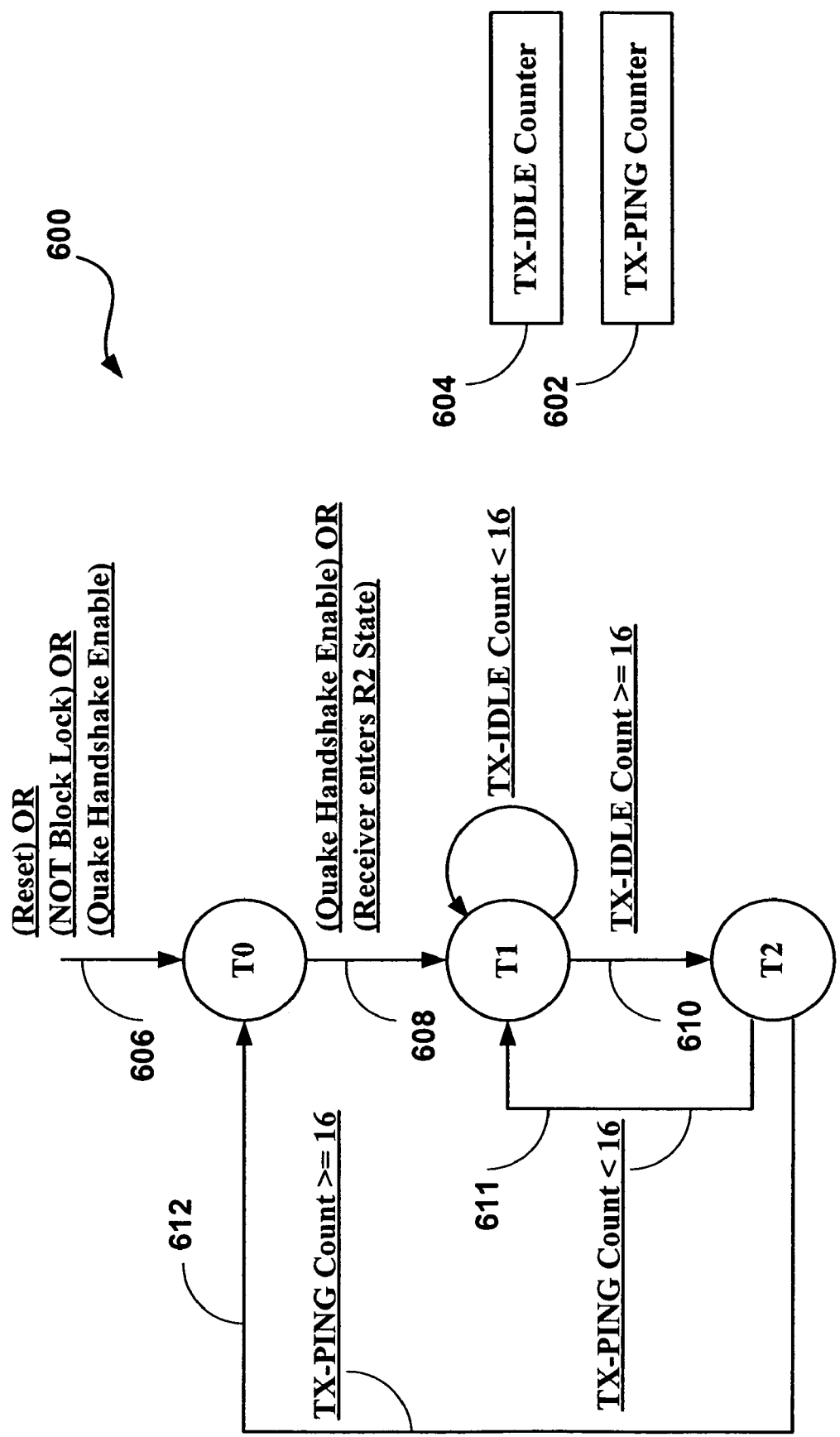
FIG. 6 Transmit Handshake

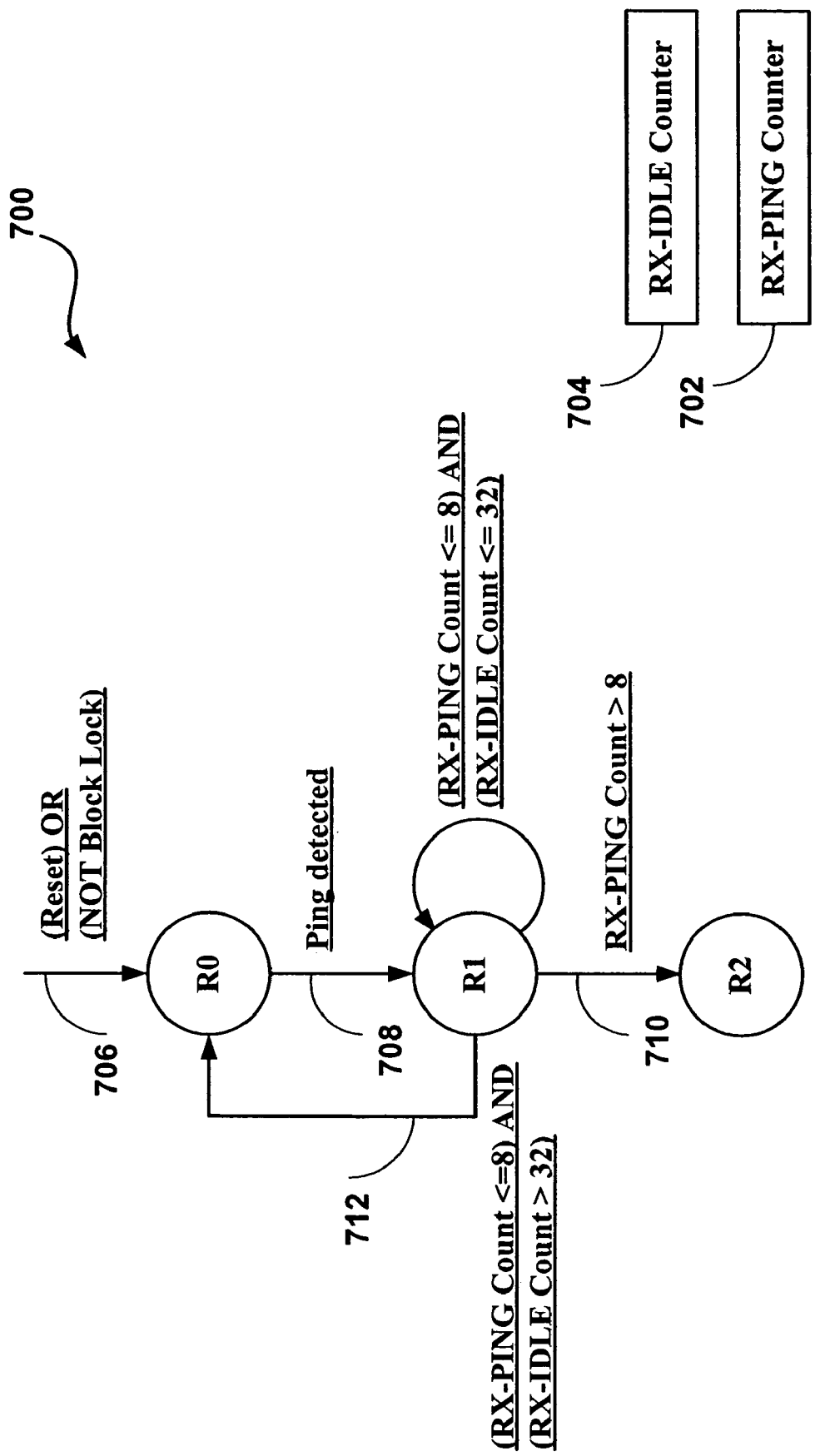
FIG. 7 Receive Handshake

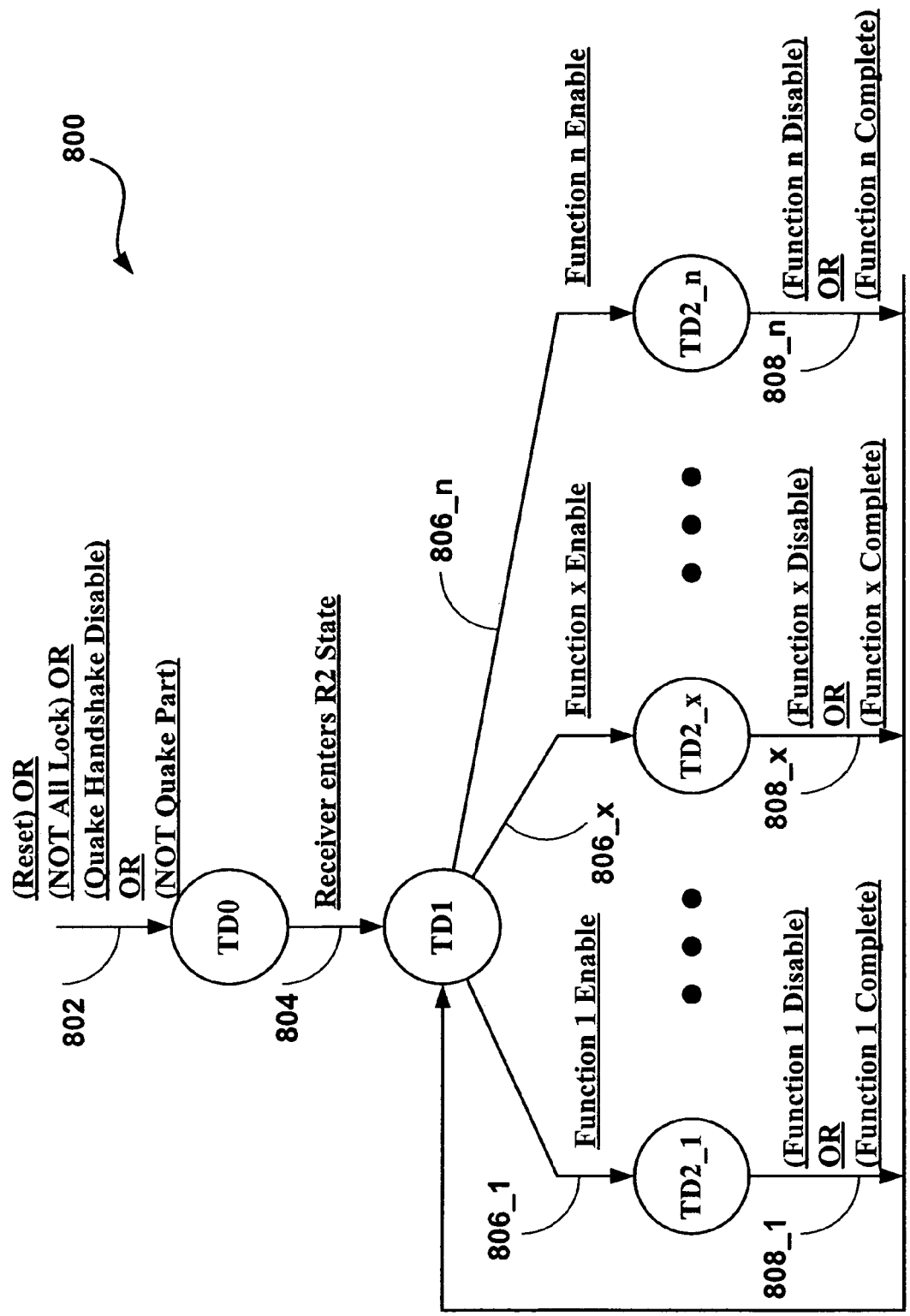
FIG. 8 Transmit Features

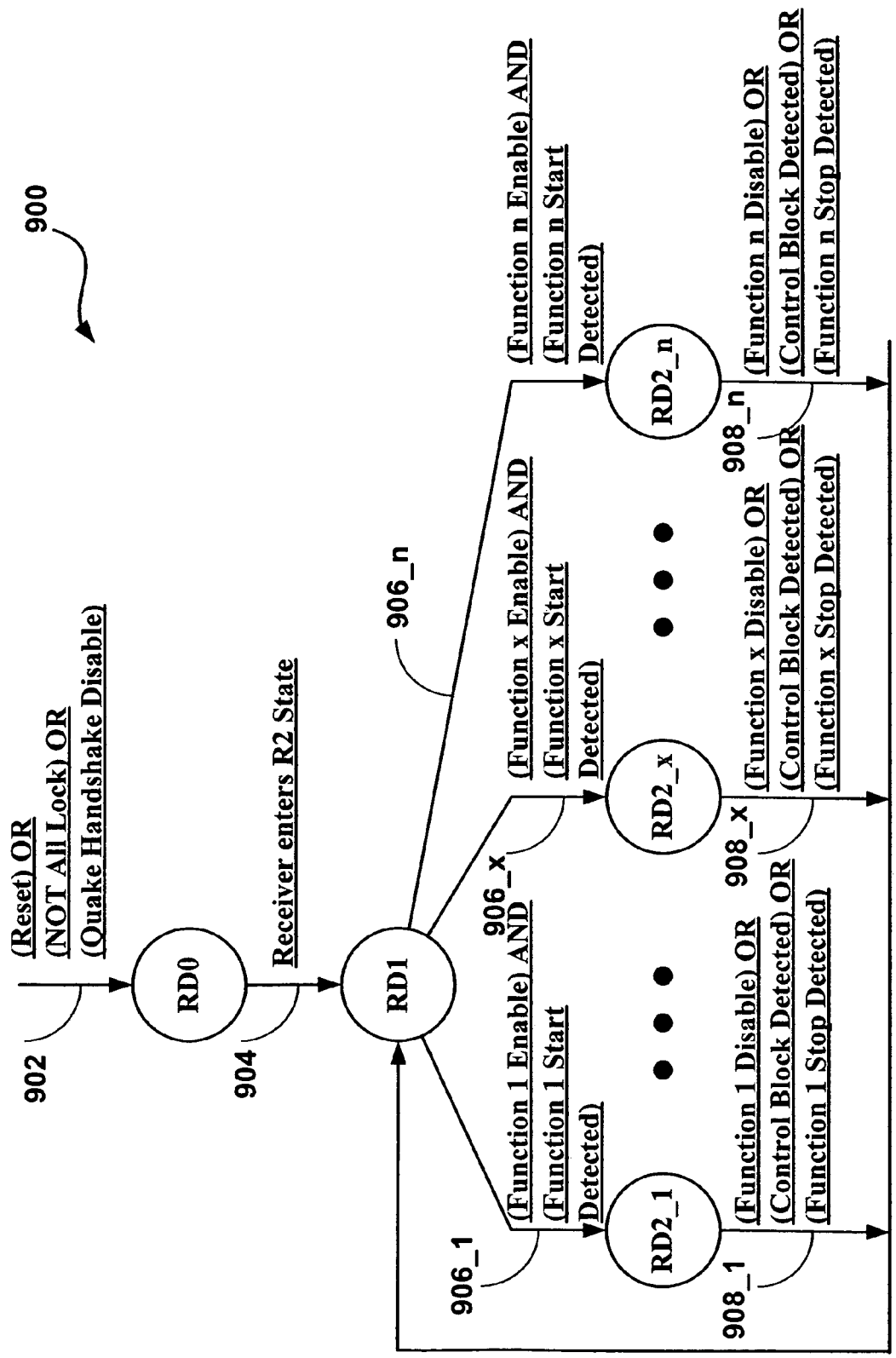
FIG. 9 Receive Features

EXTENDED LINK MONITORING CHANNEL FOR 10 GB/S ETHERNET

FIELD OF THE INVENTION

The invention related to Ethernet communications networks, and in particular, to an extended link monitoring channel for 10 Gb/s Ethernet.

BACKGROUND OF THE INVENTION

The Ethernet Standard (IEEE 802.3) has recently been extended to include optical communications links operating at the speed of 10 Gb/s (IEEE Draft P802.3ae 2002). In this application, the IEEE 802.3 standard with its supplements will simply be referred to as the standard, and will be incorporated herein by reference.

For communication links in Local Area Network (LAN) and Metropolitan Area Network (MAN) environments, the new type of links (also known as 10GBASE) provides a lower cost alternative to SONET OC192 which has traditionally been employed for optical communications links to carry payload data of the order of 10 Gb/s between distant nodes.

Note that the Ethernet Standard IEEE 802.3 describes a number of variations of the 10GBASE family of links, combinations of suffixes such as R, X, S and L, M, and W referring to variants of format and of optical characteristics (see clause 44 of the standard). A variant of interest in Metropolitan environments is denoted 10GBASE-R (clause 49 of the standard). The 10GBASE standard also includes an optional format for embedding 10 Gb/s Ethernet signals at a slightly lower bit rate, as a payload within a SONET OC192 signal (10GBASE-W, clause 50 of the standard). The primary use of 10GBASE-W is in MANs and Wide Area Networks (WAN) where SONET is the predominant infrastructure.

While SONET provides for a variety of payload types which may include synchronous data as well as packet data, the 10GBASE-R links are designed to carry Ethernet packets directly, with a much simpler overhead structure than SONET.

SONET, having originally been developed as a universal optical transport protocol including long haul, provides a large number of overhead features, many of which may not be needed in a MAN environment, especially in cases where the only payload is packet data.

Ethernet on the other hand, having originally been developed as a LAN medium (and having evolved in speed to 10 Gb/s, and in scope to MAN), lacks some overhead features which may be desirable when used directly to interconnect nodes in a MAN environment. In many cases, with a packet transport medium, link related messages could be carried in additional packets, alongside the packets that carry user data.

This practice has a number of undesirable consequences: packet bandwidth that is used in carrying link related data is not available as user packet bandwidth; user packets and link related packets are distinguished only through their packet headers, increasing the possibility of malfunctions caused by incorrect headers, malicious packets, or decoding errors; and it may be difficult to provide access to the packet stream for the insertion of link related messages at link ends, for example requiring extra buffers and causing unwanted delay.

Another concern is the reduced ability of the Ethernet formats to provide link maintenance and link supervision features, especially when compared to such features in SONET. For example, SONET provides extensive bit-error monitoring of links using bit interleaved parity (BIP), and alarms for reporting error conditions from the far end.

A 10GBASE-R link according to the prior art is illustrated in FIG. 1. Shown is a bidirectional 10GBASE-R link system 100 interconnecting at the physical level two nodes, Node "A" (102) and Node "B" (104). The system comprises two 10GBASE-R transceivers 106 and 108 (commonly referred to as physical layer interface, or "PHY", devices), interconnected by a transmission link 110. The transmission link 110 is also referred to as a "10 Gb/s Ethernet Link". Electrical "10 Gigabit Attachment Unit Interfaces" (XAUI) 112 and 114 provide access to the link from other equipment (not shown) in the nodes 102 and 104 respectively.

Each of the transceivers 106 and 108 comprises a number of adaptation modules 116-122 to convert signals between the XAUI interfaces and the 10 Gb/s Ethernet Link 110, as well as a control module 124 for controlling the modules 116-122 and other devices. The transceivers 106 and 108 may also include electro-optical devices which are not shown.

In conformance with the standard, the conversion is done in two steps through intermediate internal interfaces 126 and 128 referred to as XGMII or "10 Gigabit Media Independent Interface".

The adaptation modules are of two types, "XGMII Extender Sublayer" module types (XGXS) 116 and 118 for converting between XAUI (112, 114) and XGMII (126, 128) in each direction, and "Physical Coding Sublayer" module types (PCS) 120 and 122. For a 10 Gb/s Ethernet Link 110 according to the 10GBASE-R standard, the PCS modules 120 and 122 provide conversion in each direction between the XGMIIs (126, 128) and the specific signal format that is used on the 10 Gb/s Ethernet Links (110) based on the 10GBASE-R standard.

Also provided in the standard for 10GBASE-R are definitions for device control using a "Management Data Input/Output" interface (MDIO). The modules for device control (Control 124) shown in FIG. 1 are representative of means for controlling the interface devices, through their MDIO interfaces (not shown), and to communicate with other control structures (not shown) within the associated node.

The use of links based on the 10GBASE-R standard in environments where previously SONET OC-192 links might have been considered, leads to a significant cost reduction. Nevertheless, it is desirable to be able to transmit various types of link related information between the nodes interconnected by 10GBASE-R links without encroaching on the packet bandwidth that is committed to user data.

An example of a feature commonly employed on optical links is monitoring of the bit error rate (BER). The 10GBASE-R standard protocol provides only a rudimentary possibility for ongoing BER monitoring, for example by monitoring the correct appearance of the synchronization bits (sync bits, see FIGS. 44A-1 and 44A-2 of the standard). In the 10GBASE-R link system 100 of FIG. 1, such a feature would be controlled by the Control block 124 to monitor a BER detector in the receiving PCS device 122 of a transceiver 106 or 108, and report the result to the local control structure (not shown) within the associated node, and possibly to a network management system (not shown). Monitoring the correct appearance of the synchronization bits (2 out of every 66 bits) and extrapolating a BER from this provides only a crude estimate of the true BER, because no bit errors in the other 64 out of 66 bits are detected.

Another example of a common optical network feature is digital optical monitoring (DOM) which may exist in a link system of the type shown in FIG. 1. DOM is used for monitoring the quality of the received optical signal. This information is then commonly reported to the local control structure (not shown) within the associated node.

Overhead capabilities in optical links based on SONET include Bit Interleaved Parity (BIP for bit error monitoring), optical path identity, and other parameters embedded in the link overhead. While providing a standard (the MDIO) and other means (DOM) for the local monitoring of module and link performance, the 10GBASE-R standard, in the interest of keeping the cost of such links at a minimum, does not provide capabilities for transmitting link related information directly to the other end of the link.

The 10GBASE-R standard does provide a protocol element for signaling a local fault to the far end. This capability is intended to report a condition indicating an inability of the node to communicate, and is not suitable for link monitoring.

To improve the suitability of 10GBASE-R links in optical networks, and to provide additional link related functions it becomes necessary to develop a method and associated means to permit the insertion and extraction of additional information, compatibly with the 10GBASE-R standard protocol, without encroaching on the user data bandwidth, and without unduly increasing the cost of such links.

SUMMARY OF THE INVENTION

Therefore there is an object of the invention to provide a method and device for communicating additional information regarding 10 Gb/s Ethernet links, which would avoid or reduce the above noted problems of the prior art.

According to one aspect of the invention there is provided a transceiver between an Ethernet media access control (MAC) layer device and a 10 Gb/s Ethernet link, comprising a physical coding sublayer (PCS) extension circuit for implementing an extended link monitoring channel for said link for communicating link related information during idle periods between user data packets.

The PCS extension circuit comprises means for initializing said extended link monitoring channel, and means for transmitting and receiving the link related information. Beneficially, the PCS extension circuit has a means for processing a 10Gb/s Ethernet signal in the form of 64B/66B blocks. The means for processing comprises means for determining idle blocks of the idle periods within said Ethernet signal and replacing selected idle blocks with extended link monitoring blocks, and means for determining extended link monitoring blocks within said Ethernet signal and replacing them with idle blocks. Conveniently, the PCS extension circuit is controlled by an external device for the purpose of initializing said extended link monitoring channel, and for inserting and extracting the link related information.

For the purpose of determining a bit error rate (BER) for the link, the means for transmitting and receiving the link related information comprises means for generating a pseudo-random bit sequence (PRBS) and evaluating a received PRBS.

Advantageously, the link is a 10GBASE-R Ethernet link of the IEEE 802.3 Ethernet standard, wherein the link is an optical link. Additionally, the PCS extension circuit may comprise means for splitting the extended link monitoring channel into a number of virtual link monitoring channels, each of the virtual link monitoring channels intended for communicating a different type of the link related information.

According to another aspect of the invention there is provided a physical coding sublayer (PCS) extension circuit for a 10 Gb/s Ethernet transceiver, providing signal adaptation between an Ethernet media access control (MAC) layer device and a 10 Gb/s Ethernet link, the PCS extension circuit comprising means for implementing an extended link monitoring channel for said link for transmitting link related information during idle periods between user data packets. The PCS extension circuit comprises means for initializing said extended link monitoring channel, and means for transmitting and receiving the link related information.

Specifically, the PCS extension circuit has means for processing an Ethernet signal in the form of 64B/66B blocks. The means for processing comprises means for determining idle blocks within said Ethernet signal and replacing selected idle blocks with extended link monitoring blocks, and means for means for determining extended link monitoring blocks within said Ethernet signal and replacing them with idle blocks.

Conveniently, the PCS extension circuit is controlled by an external device for the purpose of initializing said extended link monitoring channel, and for inserting and extracting the link related information. For the purpose of determining a bit error rate (BER) for the link, the means for transmitting and receiving the link related information comprises means for generating a pseudo-random bit sequence (PRBS) and evaluating a received PRBS.

Beneficially, the transceiver is designed for a 10GBASE-R Ethernet link of the IEEE 802.3 Ethernet standard, wherein the link is an optical link. Conveniently, the PCS extension circuit further comprises means for splitting the extended link monitoring channel into a number of virtual link monitoring channels, each of the virtual link monitoring channels intended for communicating a different type of the link related information.

According to yet another aspect of the invention there is provided a node in an a 10 Gb/s Ethernet network, comprising at least two nodes connected by a 10 Gb/s Ethernet link, the node having a transceiver between an Ethernet media access control (MAC) layer device and the 10 Gb/s Ethernet link, the transceiver comprising a physical coding sublayer (PCS) extension circuit for implementing an extended link monitoring channel for said link for transmitting link related information during idle periods between user data packets.

The PCS extension circuit within the transceiver at the node has a means for processing an Ethernet signal in the form of 64B/66B blocks, the means for processing comprising means for determining idle blocks within said Ethernet signal and replacing selected idle blocks with extended link monitoring blocks, and means for determining extended link monitoring blocks within said Ethernet signal and replacing them with idle blocks. Conveniently, the PCS extension circuit comprises means for generating a pseudo-random bit sequence (PRBS) to be sent through said extended link monitoring channel, and evaluating a received PRBS for the purpose of determining a bit error rate (BER) for the link. A communications network may comprise a plurality of nodes, at least two of the connected nodes being the node of the type as described above.

According to one more aspect of the invention there is provided a method for implementing an extended link monitoring channel for a 10 Gb/s Ethernet link carrying an Ethernet signal in the form of blocks of N bits, the method comprising the step of communicating link monitoring information over said channel, wherein the step of communicating comprises determining idle blocks between blocks of user data and substituting selected idle blocks with extended link monitoring blocks including blocks to carry link related information and control blocks for said channel. The step of substituting selected idle blocks with control blocks for said channel comprises constructing said control blocks according to the IEEE 802.3 Ethernet standard and using selected reserved codes of the standard. Beneficially, the method is performed for the Ethernet signal in the form of blocks of 66 bits according to the IEEE 802.3 Ethernet standard for 10GBASE-R Ethernet links.

Beneficially, the method further comprises the step of initializing said channel, the step of initializing being performed before the step of communicating, wherein the step of initializing comprises:

determining idle blocks between blocks of user data and substituting selected idle blocks with ping blocks, which are a type of the control blocks to be sent to the far end; and receiving ping blocks from the far end.

The step of substituting with the ping blocks comprises substituting with ping blocks constructed with such selected reserved codes of the IEEE 802.3 Ethernet standard that, when received by a transceiver at the far end which lacks the PCS extension circuit, the ping blocks will not be recognized and interpreted as if they were idle blocks of the standard. The step of substituting selected idle blocks with extended link monitoring blocks comprises substituting each of the selected idle blocks with one of the following types of the extended link monitoring blocks:

a Q-start block;
a channel data block; and
a Q-stop block, wherein the Q-start block and Q-stop block are control blocks, and the channel data block carries the link related information.

Advantageously, the step of initializing comprises:
substituting the selected idle blocks with the ping blocks to be sent to the far end so that only each $(N_1+1)$-th idle block is substituted with the ping block until a total of $N_X$ ping blocks has been substituted; and
receiving from the far end at least $N_R$ ping blocks separated by no more than $N_J$ idle blocks, $N_R$ being less or equal to $N_X$, and $N_J$ being equal to or greater than $N_1$. Conveniently, $N_1=16$, $N_X=16$, $N_R=8$, $N_J=32$.

The step of communicating comprises substituting the selected idle blocks with a sequence of the Q-start block, zero or more of the channel data blocks, and the Q-stop block, the sequence forming a link monitoring packet. The step of substituting with the Q-start block comprises substituting with the Q-start block having an identifier for a virtual link monitoring channel within said extended link monitoring channel, the virtual link monitoring channel intended for communicating a specific type of the link related information.

According to one more aspect of the invention there is provided an extended link monitoring channel for a 10 Gb/s Ethernet link extending between a physical coding sublayer (PCS) devices for communicating link related information during idle periods between user data packets, the link related information being one or more of the following:

a pseudo random bit sequence (PRBS) for bit error rate measurement;
data from a digital optical monitoring (DOM) subsystem for monitoring optical link parameters;
information contained in registers of the PCS devices; and
link states and alarms.

BRIEF DESCRIPTION OF THE DRAWINGS

Embodiments of the invention will now be described, by way of example, with reference to the accompanying drawings in which:

FIG. 6 illustrates a Transmit Handshake state diagram, showing part of the initialization protocol of the embodiment of the invention;

FIG. 7 illustrates a Receive Handshake state diagram, showing another part of the initialization protocol of the embodiment of the invention;

FIG. 8 illustrates a state diagram of the Transmit Features Operation of the embodiment of the invention; and FIG. 9 illustrates a state diagram of the Receive Features Operation of the embodiment of the invention.

DETAILED DESCRIPTION OF THE EMBODIMENT OF THE INVENTION

An Extended Link Monitoring Channel has been developed to be incorporated in a 10GBASE-R link providing the capability to transmit information in addition to, and without affecting, the carriage of user data packets. The Extended Link Monitoring Channel can be used to conduct exhaustive BER measurements over the link, transmit the results of Digital Optical Monitoring (DOM), or any other information. The Extended Link Monitoring Channel requires enhancements to the transceiver for 10GBASE-R, an initialization procedure to set up the channel, and a transfer protocol for the use of the channel.

Transceiver

Figure 1:
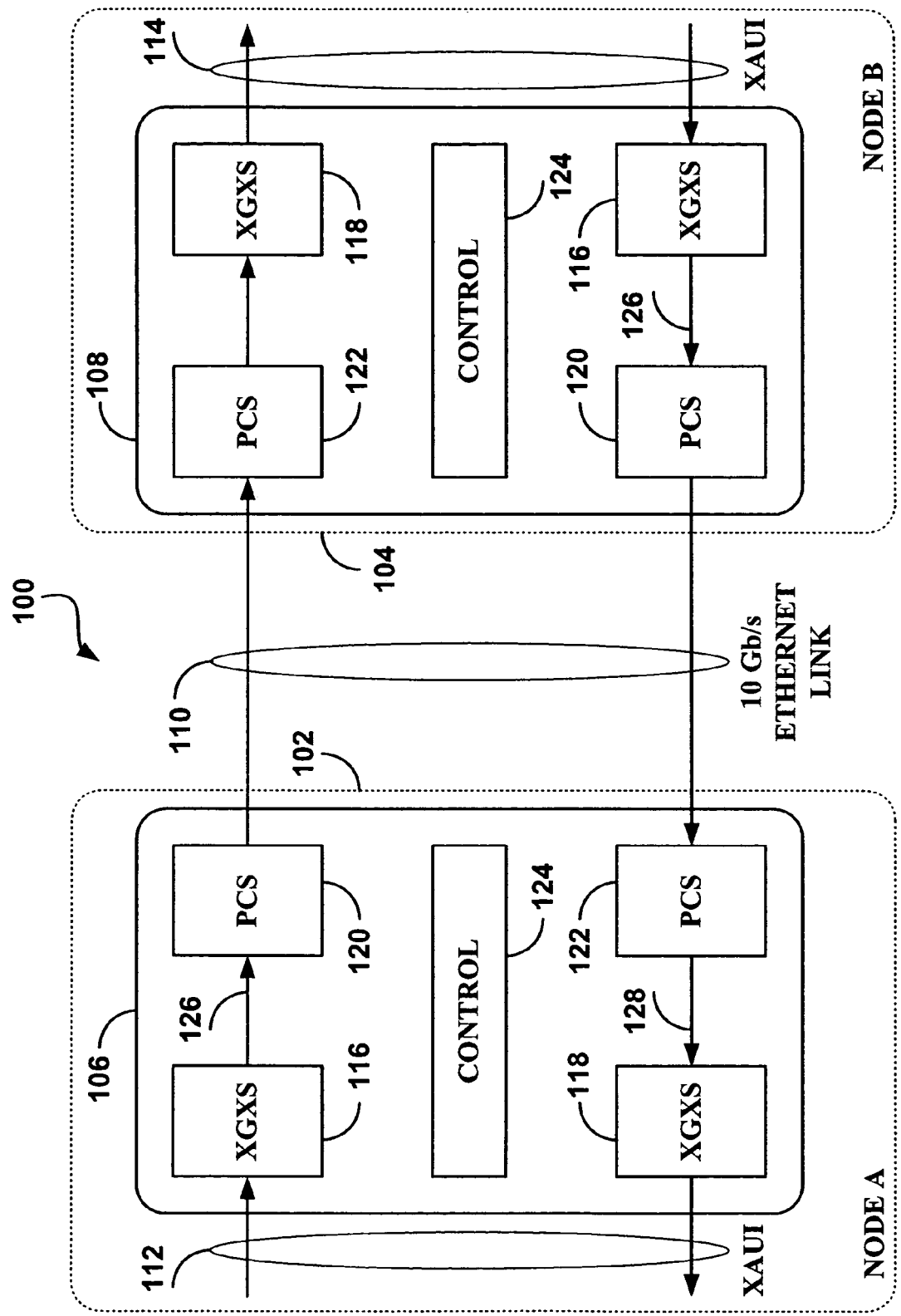
FIG. 1 illustrates a typical optical communications system using 10 Gb/s Ethernet links (10GBASE-R) according to the Ethernet 802.3 standard of the prior art.
Figure 2:
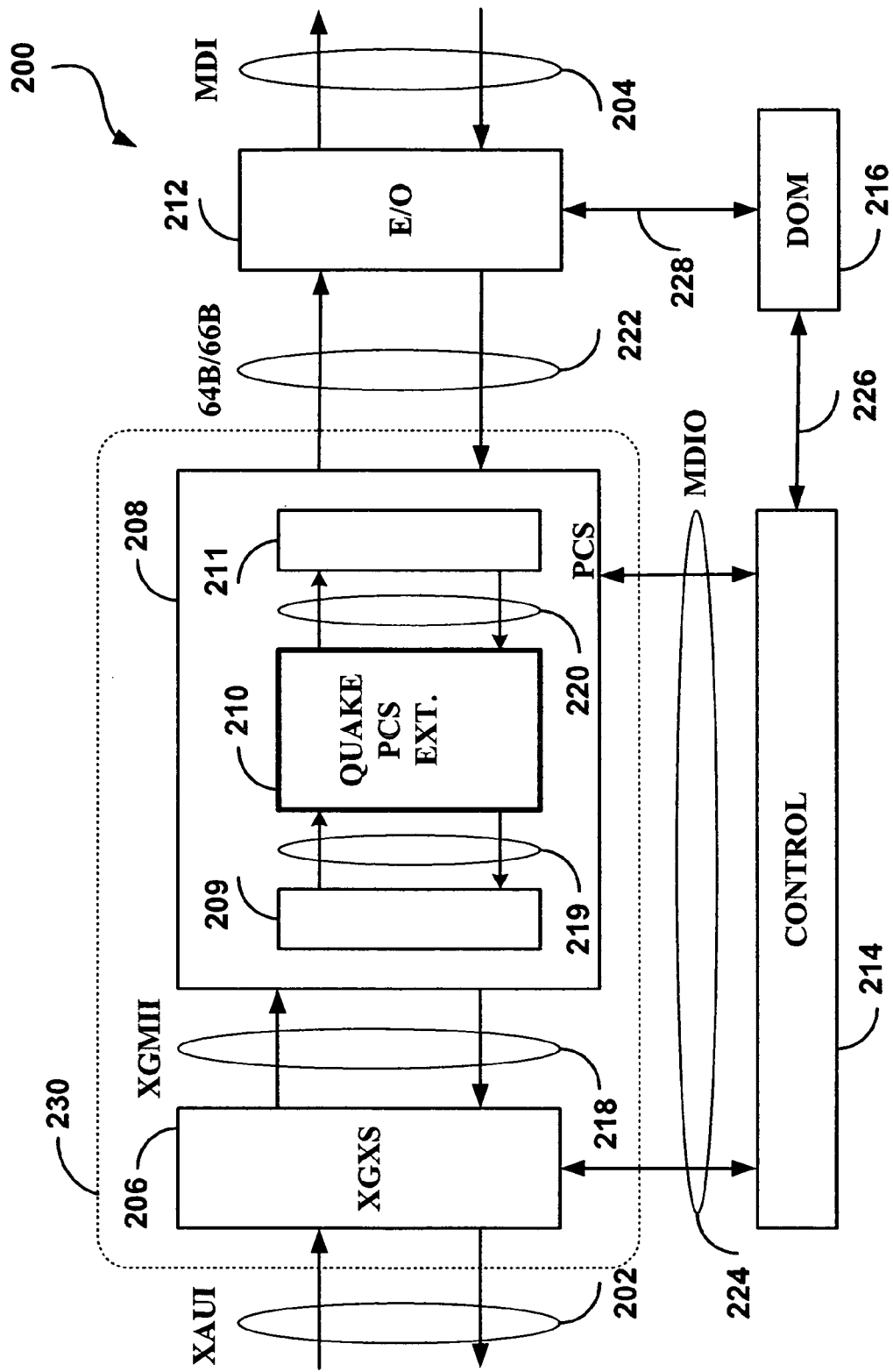
FIG. 2 is a block diagram of a transceiver for improved 10GBASE-R links according to an embodiment of the invention.

A transceiver 200 for an improved 10GBASE-R link having means for implementing an Extended Link Monitoring Channel according to an embodiment of the invention, is shown in FIG. 2.

The transceiver 200 comprises a number of modules operating in both the transmit direction and the receive direction between an electrical "10 Gigabit Attachment Unit Interface" (XAUI) 202 and an optical "Media Dependent Interface" (MDI) 204. The transceiver 200 provides a connection between an Ethernet media access control (MAC) layer device (interfaced at the XAUI 202) and a 10 Gb/s Ethernet link (interfaced at the MDI 204) while simultaneously providing the Extended Link Monitoring Channel for communicating link related information during idle periods between user data packets. Details of the implementation will be described in this and the following sections.

The modules include:
a "XGMII Extender Sublayer" module (XGXS) 206;
a "Physical Coding Sublayer" module (PCS) 208 including
 a PCS 64B/66B Coder circuit 209,
 a Quake PCS extension circuit 210, and
 a PCS scrambler circuit 211; and
an Electro-Optical module (E/O) 212 providing the interface to an optical link.

In addition, the transceiver 200 includes a control module 214 and a Digital Optical Monitoring module (DOM) 216.

Intermediate interfaces between the modules and the circuits are;

a "10 Gigabit Media Independent Interface" (XGMII) 218 between the XGXS module 206 and the PCS module 208;

an internal interface 219 between the PCS 64B/66B Coder circuit 209 and the Quake PCS extension circuit 210 in the PCS module 208;

a second internal interface 220 between the Quake PCS extension circuit 210 and the PCS scrambler circuit 211 in the PCS module 208;

a 64B/66B electrical interface 222 between the PCS module 208 and the E/O module 212;

MDIO interfaces 224 between the control module 214, and the XGXS module 206 and the PCS 208 module;

a link 226 between the control module 214 and the DOM module 216; and a link 228 between the DOM module 216 and the E/O module 212.

The XAUI interface 202, the XGMII interface 218, the 64B66B interface 222, and the MDI interface 204 are described in detail in the standard. The internal interfaces 219 and 220 are conveniently similar to the 64B/66B electrical interface 222, as described in the standard.

The modules 206 and 208 (containing circuits 209, 210, and 211) may be grouped into a single electrical data path device 230. It should be understood that the division of the embodiment of the data path device 230 into modules, circuits, and interfaces is done to facilitate the description. This is especially convenient, since the standard provides a description of the XGMII 218. Further, the modules 206 and 208 may be manufactured together in a single integrated circuit (the data path device 230). In this case the interfaces 218, 219, and 220 are embedded within the device 230, and not available outside the device.

In its basic operation (without the Extended Link Monitoring Channel enabled), the transceiver 200 converts received XAUI signal from the XAUI 202 into the 64B/66B signal at the interface 222, as well as converting the 64B/66B signal from the interface 222 into the XAUI signal at the XAUI 202, in the conventional manner prescribed by the standard. The conversion occurs in two steps, through the XGXS module 206 to convert the XAUI signal 202 to the XGMII signal at the interface 218 (and the reverse), and through the PCS module 208 to convert the XGMII signal at the internal interface 218 to the 64B66B signal at the interface 222 (and the reverse). Within the PCS module 208, conversion between the XGMII signal at the interface 218 and the 64B/66B signal at the interface 222 includes two steps in the conventional manner prescribed by the standard: through the PCS 64B/66B Coder circuit 209 between the XGMII signal at the interface 218 and the internal interface 219, and through the PCS scrambler circuit 211 between the second internal interface 219 and the 64B/66B signal at the interface 222. When the Extended Link Monitoring Channel is not enabled, the Quake PCS extension circuit 210 simply passes the signal at the internal interface 219 to the second internal interface 220 and vice versa.

A handshake protocol (see FIGS. 6 and 7 below for details) is implemented in the Quake PCS extension circuit 210 in order to initialize and thus enable the Extended Link Monitoring Channel.

The means for implementing the Extended Link Monitoring Channel, including the functions of initializing the channel and for inserting and extracting the link related information, is the Quake PCS extension circuit 210 between the internal interface 219 and the second internal interface 220. Briefly, when the Extended Link Monitoring Channel is enabled, the Quake PCS extension circuit 210 passes user data signals (Ethernet packets) transparently, but processes the idle signals between the Ethernet packets (the Inter Packet Gaps or IGPs) in a novel way to achieve the insertion and extraction of the Extended Link Monitoring Channel. The data inserted or extracted may be generated and received by feature circuits (e.g. PRBS generation and monitoring) within the PCS module 208, or communicated to and from the Control module 214 over the MDIO interface 224. Applications of the Extended Link Monitoring Channel are described further below.

The 64B/66B signal at the interface 222 is converted to the optical signal at the MDI 204 by the E/O module 212 (and the reverse). The DOM module 216 comprises means for monitoring parameters of the E/O module 212, such as the received optical power, and the optical transmitter current. In the preferred embodiment, the DOM contains an EEPROM (Electrically Erasable Programmable Read Only Memory) to store a history of such parameters to facilitate their recovery and diagnosis after an optical path failure.

The control module 214 has access to registers in the data path device 230 via the standard MDIO interface 224, as well as to the results of the DOM 216 through the interface 226. The control module 214 is operatively connected to the control system (not shown) of the node in which the transceiver 200 is located.

The Extended Link Monitoring Channel, through the means of the Quake PCS extension circuit 210, includes the ability for the control module 214 to monitor the information stored in the DOM 216 and then transmit this information via the MDIO interface 224 and the Quake PCS extension circuit 210 to the Control module 214 in a remote transceiver.

Similarly, a pattern generator (PRBS generator) may be included in the Quake PCS extension circuit 210. The Extended Link Monitoring Channel can then be used to conduct BER tests over the optical link as will be described in more detail below. The BER tests are controlled (function enabled), and the results collected, by the Control module 214 through the MDIO interface 224.

In either case, the Quake PCS extension circuit 210 provides the means for initializing the Extended Link Monitoring Channel, and the means for transmitting and receiving the link related information as described in the next sections.

Basic 64B/66B Format

Figure 3:
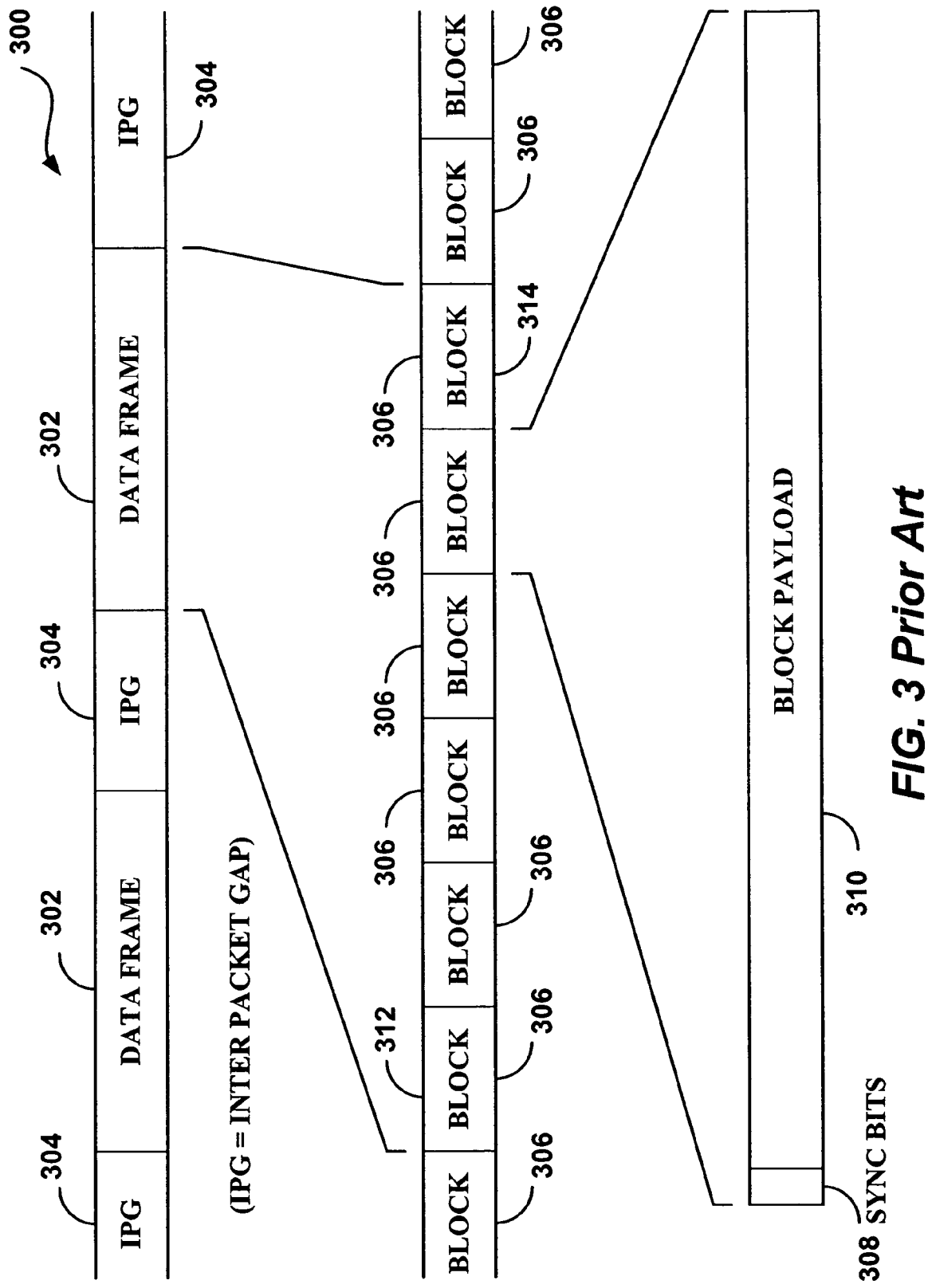
FIG. 3 shows the format of the 10GBASE-R signal at the 64B/66B interface according to the Ethernet 802.3 standard of the prior art.

The format of the electrical Ethernet signal at the 64B/66B interface 222 is shown in FIG. 3. This is also the format of the optical signal that appears after electro/optical conversion at the MDI 204. The format is described in the standard (clauses 44 and 49), but is summarized here for convenience.

The transmitted data is a serial bit stream 300 consisting of alternating Data Frame segments 302 and Inter Packet Gaps (IPG segments) 304. Each Data Frame segment 302 carries an Ethernet packet (not shown in detail), and is comprised of a number (one or more) of Blocks 306. Because the length of Ethernet packets is variable, the length of each Data Frame segment 302, and thus the number of Blocks 306 is variable and depends on the length of the Ethernet packet.

Inter Packet Gaps 304 (the idle periods between user data packets) are also comprised of Blocks 306. The number of Blocks 306 making up a Data Frame segment 302 or an IPG segment 304 is always an integer number, where the number of blocks in a Data Frame segment 302 depends on the length of the Ethernet (user) packet, and the number of blocks in an IGP segment 304 is at least one, and depends on the intensity of the Ethernet packet traffic. When there are fewer or shorter Ethernet packets to send, the length of the individual IGP segments 304 is increased accordingly.

The IPG segments 304 also serve a function in clock justification, to provide elasticity between the clock domains of the sending and receiving node, i.e. blocks 306 of an IPG segment 304 can be dropped or added as permitted by the standard to avoid overflow or underflow of the receive packet buffer. However, no justification is required between a sending PCS module 208 (including the Quake PCS extension circuit 210), and its receiving counterpart since the receiving circuitry in these modules derives its clock from the link that is driven at the clock rate of the transmitting PCS module 208. Clock justification (dropping or inserting extra IPG blocks as needed) is carried out in the XGXS module 206, or at the XGMII interface 218, and is of no further interest here.

Each Block 306 is comprised of Sync Bits 308 and a Block Payload 310. The number of Sync Bits in each Block 306 is two. The Sync Bits have the bit values "10" if the block is a Data block (within a Data Frame 302). The bit values are "01" if the block is a Control block (part of an Inter Packet Gap 304), a Start block 312 (first block) of a Data Frame 302, or a Terminate block 314 (last block) of a Data Frame 302).

In general, Blocks 306 having the sync bit values "01" are termed "Control blocks". Different types of control blocks are distinguished from each other by the value of the first byte (the "Block Type Field") of the block payload 310 (see section 49.2 "Physical Coding Sublayer (PCS)" of the standard).

Extended Link Monitoring Channel

Since each Data Frame 302 must be separated from the next Data Frame 302 by an Inter Packet Gap (IPG) 304, a channel may be created by utilizing some bandwidth within the Blocks 306 that make up the IPGs 304. This channel (the Extended Link Monitoring Channel) is created and accessed by the Quake PCS extension circuit 210 (FIG. 2) which is controlled through the MDIO interface 224. The Quake PCS extension circuit 210 intercepts the data flowing between the internal interface 219 and the second internal interface 220, and is capable of modifying or replacing any Blocks 306 of IPGs (idle blocks) that occur.

Figure 4:
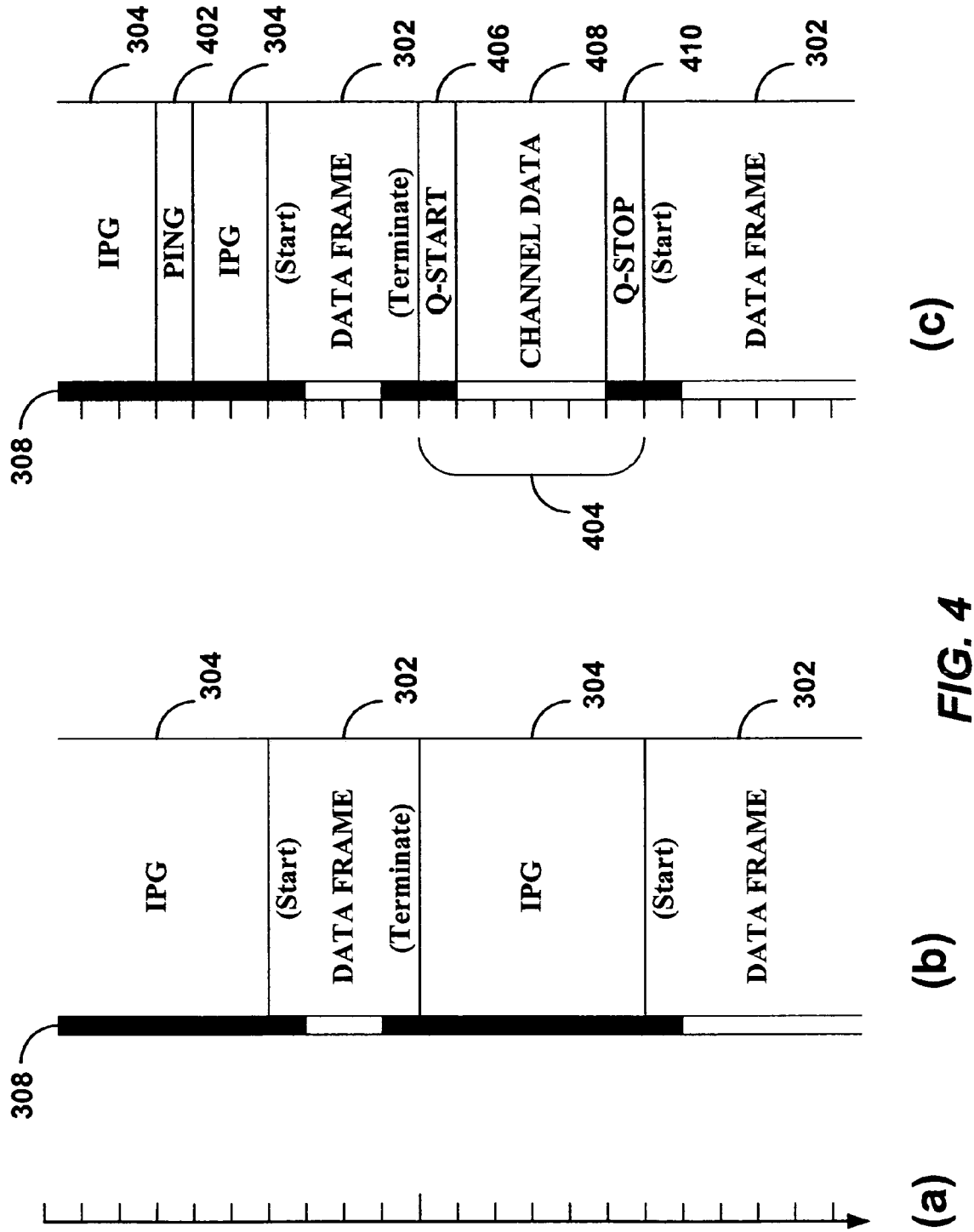
FIGS. 4a, b and c illustrate respectively, a time line (a), a diagram of a standard 10GBASE-R signal (b), and a diagram of a 10GBASE-R showing the operation of the Extended Link Monitoring Channel of the embodiment of the invention (c)

An overview of the establishment (initialization) and the data transfer operation (communicating link related information) of the Extended Link Monitoring Channel is shown in a timing diagram in FIG. 4.

There are three time lines drawn vertically in FIG. 4;
(a) a scale;
(b) a transmission sequence representative of a signal at the internal interface 219; and
(c) a transmission sequence representative of a signal at the second internal interface 220.

Each tick on the time line (a) represents one Block 306 (FIG. 3). The time line (b) shows a sequence of IPG segments (idle periods) 304 and Data Frame segments (user data packets) 302, similar to FIG. 3. The borders of the segments indicate the type of Block 306, as indicated by the Sync Bits 308. Sync bit values of "10" are indicated by open rectangles (Data blocks), while solid black rectangles indicate sync bit values of "01" (Control blocks). Note that the possible appearance of control blocks (indicating errors) within the Data Frame segments 302 is ignored here, for simplification.

Without the Extended Link Monitoring Channel, or if the Extended Link Monitoring Channel is not enabled, the time line (b) is also the form of the signal that would be sent or received at the second internal interface 220.

The time line (c) shows a sequence of IPGs 304 and Data Frames 302, interspersed with additional blocks and segments, representing the initialization and operation of the Extended Link Monitoring Channel. A Ping block 402, is part of the handshake protocol (see FIGS. 6 and 7 below) used to initialize the Extended Link Monitoring Channel. A Link Monitoring Packet 404 is a sequence of a Q-Start block 406, a Channel Data segment 408 (a sequence of channel data blocks), and a Q-Stop block 410. A sequence of one or more Link Monitoring Packets 404 comprises the transfer protocol of the Extended Link Monitoring Channel.

The Ping block 402 as well as the Q-Start and Q-Stop blocks (406 and 410) are special control blocks and have sync bit values of "01" (indicated by solid black rectangles). The Channel Data segment 408 has sync bit values of "10", as indicated by the open rectangle.

It is worth noting here that the initialization and operation of the Extended Link Monitoring Channel, i.e. the transmission of the Ping blocks 402 and of Link Monitoring Packets 404 occurs during periods that would otherwise be occupied by IPG segments 304 (idle periods). The transmission of the user data packets (Data Frame segments 302) is not affected. In other words, the idle periods between the user data packets are used to establish and utilize the Extended Link Monitoring Channel.

Block Coding for the Extended Link Monitoring Channel

The Ping block 402 as well as the Q-Start and Q-Stop blocks (406 and 410) need to be distinguished from ordinary IPG segments 304.

Figure 5:
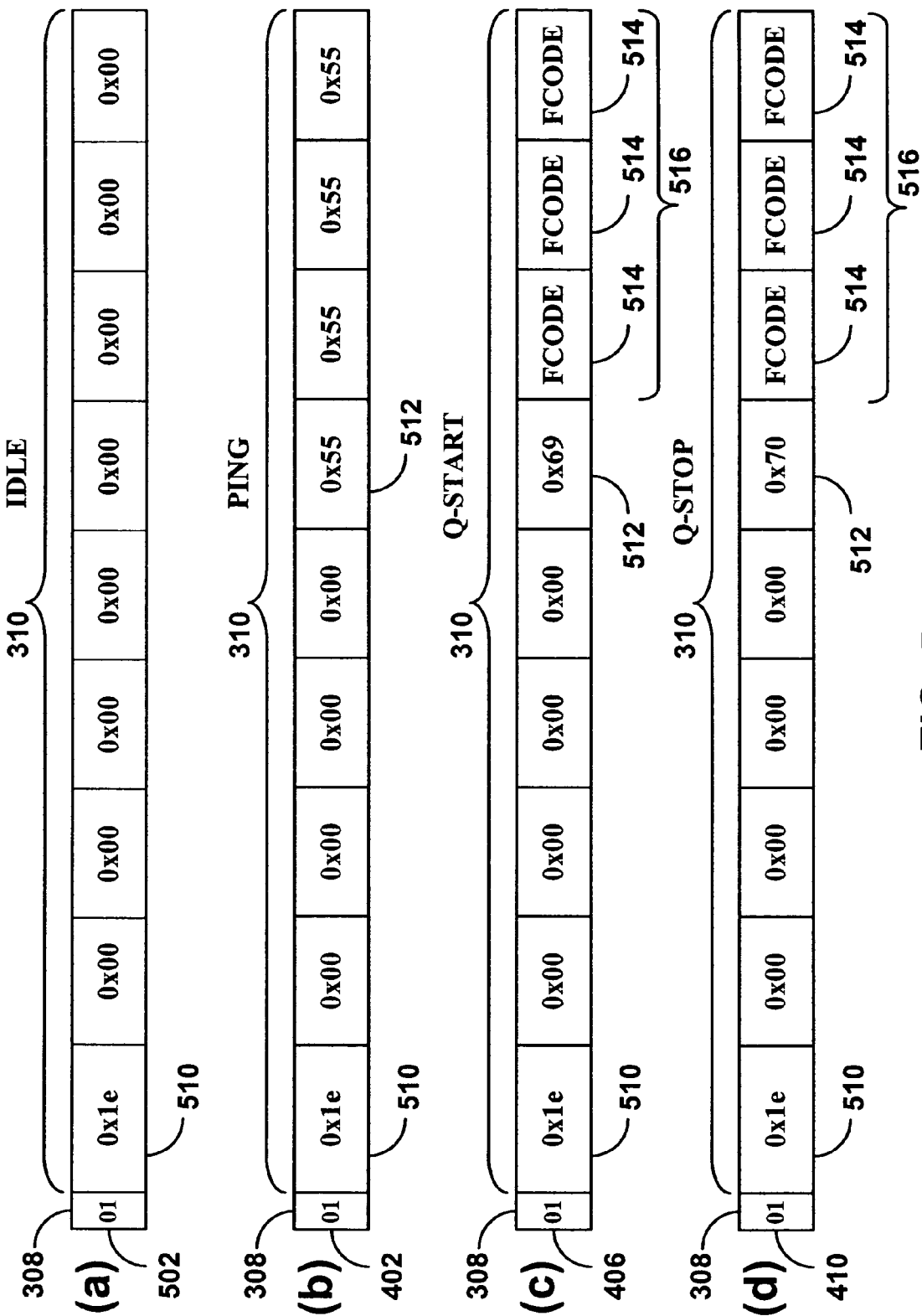
FIGS. 5a, b, c, and d show respectively, the formats of an idle block of the prior art (a), of a Ping block (b), of a Q-Start block (c), and of a Q-Stop block (d) of the embodiment of the invention.

The standard (clause 49 of the standard) already provides a coding for the blocks of the IPG segment 304. FIG. 5 illustrates the coding for the blocks of the IPG segment 304 (IPG block 502, also referred to as "idle block"), and preferred specific encodings of the Blocks 306 for each of the cases of Ping (Ping block 402), Q-Start (Q-Start block 406), and Q-Stop (Q-Stop block 410).

Note that the description of the specific hexadecimal codes refers to their values as they would appear at the second internal interface 220 (before the scrambling that is mandated by the standard). The standard provides the mapping of codes between the XAUI, XGMII, and 64B/66B interfaces.

Each of the blocks 502, 402, 406, and 410 are 66-bit blocks, with the first two bits (sync bits 308) having the sync bit values "01", indicating that the type of block (Control blocks). The remainder of the block constitutes the block payload 310 (see FIG. 3).

Within the block payload 310, the first (8-bit) byte of each of the blocks 502, 402, 406, and 410 is a Block Type Field 510 having the hexadecimal value 0x1e. The remaining 56 bits of the block payload 310 of each of the blocks 502, 402, 406, and 410 are divided into eight 7-bit units ("7-bit bytes").

For the IPG block 502, the values of the eight 7-bit bytes are prescribed by the standard as 0x00.

The values for the Ping block 402 were selected from the reserved codes in Table 49-1 of the standard, so that they are automatically translated into idle codes if any of these blocks are received by a transceiver that does not include the Extended Link Monitoring Channel described here.

As shown in FIG. 5, the first four of the 7-bit bytes have the value 0x00. The fifth byte, a Block discriminator byte 512, is preferably assigned the values 0x55 (Ping block), 0x69 (Q-Start block), and 0x70 (Q-Stop block).

The remaining three 7-bit bytes have the value 0x55 in the Ping block 402, and a set of possible feature code values (FCODE 514) in the cases of the Q-Start and Q-Stop blocks 406 and 410. The set of feature code values includes the (standard reserved) values 0x33, 0x66, and 0x78. Different combinations of these feature code values may be used to identify different features for which a Channel Data segment 408 is used. The set of 3 values in three byte positions results in a total of 27 possible different combinations, capable of identifying up to 27 features. The combination of three feature code values FCODE 514 that are present in a Q-Start block 406 or a Q-Stop block 410 is referred to as a "Function Code" 516. Preferably, the Function Codes 516 in the Q-Start block 406 and in the Q-Stop block 410 of a single Link Monitoring Packet 404 are equal. Virtual Link Monitoring Channels are distinguished by their Function Codes 516 in the Q-Start and Q-Stop blocks 406 and 410, each feature thus having a separate Virtual Link Monitoring Channel available.

Note that, generally speaking, the method of initialization of the Extended Link Monitoring Channel and the method of communicating over this channel, operate by transmitting extended link monitoring blocks (Ping blocks 402, Q-Start blocks 406, Q-Stop blocks 410, and plain channel data blocks of the Channel Data segments 408) instead of (substituting for) idle blocks 502 between user data packets. The encoding of the control blocks 402, 406, and 406, has been chosen using reserved codes of the standard. Thus, at the receiving end, the distinct codes of the extended link monitoring blocks enable these blocks to be recognized by the Quake PCS extension circuit, processed (initialization of the Extended Link Monitoring Channel and reception of the link related information), and replaced by Idle blocks 502 before the signal is passed on to the XAUI 202.

At the same time, the encoding of the Ping block 402 has been chosen so that a far end transceiver that lacks a Quake PCS Extension circuit does not fail, but absorbs any Ping blocks 402 it may receive as if they were idle blocks (exploiting a feature of the standard which allows a number of alternate idle codes to be present in the signal).

Extended Link Monitoring Channel Initialization

The use of the Extended Link Monitoring Channel requires that the transceivers at both ends of a link are compatible and equipped with the Quake PCS extension circuit 210. A handshake of Ping blocks 402 is used to confirm this. The block coding for Ping blocks 402 (see above) is designed to be safely ignored by a prior-art transceiver (a transceiver conforming to the existing standard but not containing the Extended Link Monitoring Channel).

An initialization procedure at each end of a link relies on sending a handshake sequence comprising $N_X$ Ping blocks 402, each successive Ping block 402 preceded by (and thus separated from the next Ping block 402 by) $N_1$ Idle blocks 502. At least $N_R$ Ping blocks 402, spaced by no more than $N_J$ Idle blocks 502 must be received by a transceiver to complete initialization. The values $N_1=16$, $N_X=16$, $N_R=8$, and $N_J=32$ have been selected in the preferred implementation of the algorithm to ensure robust recognition by a compatible transceiver, and to minimize the risk of a non-compatible transceiver being falsely recognized as compatible.

If an idle period (original IPG segment 304) is too short to insert a complete handshake sequence, the counting of Idle blocks 502 and sending of Ping blocks 402 is resumed in the next idle period.

The transceivers 200 (see FIG. 2) at each end of a link, acting as transmitters as well as receivers, must complete both handshakes for a successful initialization of the Extended Link Monitoring Channel. The means for executing the initialization procedure resides in the Quake PCS extension circuit 210 of each transceiver 200.

The initialization procedure is described as a pair of state diagrams, a Transmit Handshake 600 shown in FIG. 6, and a Receive Handshake 700 shown in FIG. 7.

Transmit Handshake 600 (FIG. 6)

There are three states, a "TX IDLE" state T0, a "SENDING IDLE" state T1, and a "SENDING PING" state T2. The states are reached by state transitions 606 into T0, 608 from T0 to T1, 610 from T1 to T2, 611 from T2 to T1, and 612 from T2 to T0. The transitions are also labeled with the signal, event, or condition which causes the transition to occur.

A number of control signals (originating in the Control module 214) are used:
"Reset": Resets the device;
"Block Lock": Reception of 64B/66B blocks is in sync;
"Quake Handshake Disable": Disables the handshake (initialization) procedure; and
"Quake Handshake Enable": Enables the handshake (initialization) procedure.

The Transmit Handshake 600 contains two counters:
a TX-Ping counter 602 to count the number of Ping blocks 402 sent; and
a TX-Idle counter 604 to count the number of Idle blocks 502 detected.

An event of relevance to the Transmit Handshake 600 is:
"Receiver enters R2 state": This event is received from the Receive Handshake 700 (see below).

The state T0 (TX IDLE) is entered (transition 606 to T0) when any of the following occur:
the "Reset" signal is true (the device is reset);
the "Block Lock" signal is removed (block synchronization is lost); or
the "Quake Handshake Disable" signal is or becomes true.

When in the T0 state, the Transmit Handshake 600 clears (sets to 0) the TX-Ping and TX-Idle counters 602 and 604.

The T1 state (SENDING IDLE) is first entered (transition 608 from T0 to T1) when either the "Quake Handshake Enable" signal becomes true or the Receive Handshake 700 enters the R2 state.

While in the T1 state, the Quake PCS extension circuit 210 of the data path device 230 passes Idle blocks 502 received on the internal interface 219 through to the second internal interface 220, incrementing the TX-Idle counter 604 with each Idle block 502 detected and thus sent. It remains in the T1 state (loop marked "TX-Idle count <16") as long as the TX-Idle count remains under 16.

Once a TX-Idle count of 16 is reached, The next idle block is not passed through to the second internal interface 220, but a Ping block 402 is sent instead. This is indicated by the transition 610 from T1 to the SENDING PING state T2. The TX-Ping counter 602 is incremented with each Ping block 402 sent.

If a TX-Ping count of 16 has not been reached, the Transmit Handshake 600 returns to the SENDING IDLE state T1 (transition 611), and resets the TX-Idle counter 604 to zero.

Thus each Ping block 402 (sent upon the transition from the T1 state to the T2 state) follows 16 Idle blocks 502.

Once a TX-Ping count of 16 has been reached, the Transmit Handshake 600 is complete and returns to the TX IDLE state T0 (transition 612 from T2 to T0).

The Transmit Handshake 600 operates only during the Idle Packet Gaps (IPG segments 304) and does not change state during the Data Frames 302. Thus, a number of IPG segments may be required to complete the Transmit Handshake 600, interrupted by Data Frames (user data packets) which are not affected at all.

Receive Handshake 700 (FIG. 7)

There are three states, an "RX-IDLE" state R0, a "COUNTING" state R1, and a "QUAKE DETECTED" state R2. The states are reached by state transitions 706 into R0, 708 from R0 to R1, 710 from R1 to R2, and 712 from R1 to R0. The transitions are labeled with the signal, event, or condition which causes the transition to occur.

Two control signals (originating in the Control module 214) are used:
"Reset": Resets the device; and "Block Lock": Reception of 64B/66B blocks is in sync.

The Receive Handshake 700 also contains two counters:
- an RX-Ping counter 702 to count the number of Ping blocks 402 received; and
- an RX-Idle counter to count the number of Idle blocks 502 received.

An event of relevance to the Transmit Handshake 600 (FIG. 6 above) is:
- "Receiver enters R2 state": This event is sent to the Transmit Handshake 600 when the Receive Handshake 700 has entered the R2 state from the R1 state. The event is the same as the transition 710 from R1 to R2.

The state R0 (RX-IDLE) is entered when either of the following occur:
- the "Reset" signal is true (the device is reset); or
- the "Block Lock" signal is removed (block synchronization is lost).

When in the R0 state, the Receive Handshake 700 clears (sets to zero) the RX-Ping and RX-Idle counters 702 and 704.

The R1 state (COUNTING) is entered when a Ping block 402 is detected (transition 708 from R0 to R1).

While in the R1 state, the device counts the number of Idle blocks 502 and Ping blocks 402 received by incrementing the RX-Idle and RX-Ping counters 704 and 702 respectively. Each time a Ping block 402 is received, the RX-Idle counter 704 is reset to zero. In this way a maximum spacing rule (number of Idle blocks 502 between Ping blocks 402) is enforced.

The Receive Handshake 700 remains in the R1 state (COUNTING) as long as the RX-Ping count remains at 8 or below, and the RX-Idle count remains at 32 or below (loop marked "RX-Ping count <=8) AND (RX-Idle count <=32)").

When an RX-Ping count of 8 is exceeded, the transition 710 to the R2 state (QUAKE DETECTED) occurs, and is sent as the event "Receiver enters R2 state" to the Transmit Handshake 600 above.

However, if an RX-Idle count of 32 is exceeded while the RX-Ping count is still at 8 or below, then a transition back to the R0 state (RX-IDLE) is made, in effect indicating that the handshake has failed.

Extended Link Monitoring Channel Transfer Protocol

Once the Extended Link Monitoring Channel has been initialized between two transceivers on a link, each transceiver can use this channel to send arbitrary data to the other over the channel.

As shown in FIG. 4 above, the Link Monitoring Packet 404 is comprised of the Q-Start block 406, the Channel Data Segment 408, and the Q-Stop block 410. This format provides a clear data channel in the form of a bit-pipe that is carried transparently in the Channel Data Segment 408, allowing for additional protocols to be implemented within this channel in any convenient manner known in the art.

Furthermore, the coding of the Q-Start and Q-Stop blocks 406 and 410 with Function Codes 516 provides for the distinction of a number (up to 27) of different types of Link Monitoring Packet 404. This allows the multiplexing of a number of virtual Link Monitoring Channels over the same link, effectively splitting the Extended Link Monitoring Channel into a number of virtual Link Monitoring Channels, each intended for communicating a different type of link related information. As an exemplary use of this capability of the invention, the application of a feature is described.

A feature is a single mechanism requiring communication from one transceiver to the other transceiver over the Extended Link Monitoring Channel on a 10GBASE-R link as described above. Several features can share the Extended Link Monitoring Channel, i.e. each feature has access to a separate Virtual Link Monitoring Channel.

One exemplary feature is the transmission of DOM data, or other data pertaining to link maintenance. This type of data could be relayed from one node to another through a network management system over physically distinct control channels. In many cases however, especially when the data is of the nature of, or related to, link failure alarms, it is useful and desirable (much faster) to transmit this data directly from node to node before involving the management computers.

Another exemplary feature is the generation of a pseudo random bit sequence (PRBS) that is sent to the far end, and where the far end receives the PRBS, compares it with a locally generated PRBS, and thus determines a bit error rate (BER) of the link. This method of BER monitoring is common in the industry and is usually only possible when there is no user traffic on the link. The Extended Link Monitoring Channel of the invention provides a means to run PRBS-type BER tests during the idle periods (IPGs) of a 10GBASE-R link, in effect continuously.

A transfer protocol for multiple features ("Quake features") is described with the help of state diagrams Transmit Features 800 and Receive Features 900 in FIGS. 8 and 9 respectively.

Each Quake Feature may be assigned a Function code 516 (corresponding to a defined set of three FCODES 514, see FIG. 5). When a Quake Feature is enabled, it shares the Extended Link Monitoring Channel of the invention with other enabled features, each Quake Feature having in effect a private clear data channel (a virtual Link Monitoring Channel) for its use. The Extended Link Monitoring Channel may also be described as a multiplexed channel, capable of carrying a number of virtual Link Monitoring Channels.

Transmit Features

The Transmit Features 800 is shown in a state diagram in FIG. 8.

There are a number of states, a "TX Data IDLE" state TD0, a "Ready to Transmit Data" state TD1, and a plurality of "Function x in Progress" states TD2_x where "x" is the index of a Function code 516 ranging from 1 to n (n being the number of available Function codes 516, n=27 in the preferred embodiment).

In the interest of simplifying the description, the variable "x" is used in the names of transitions, states, and functions (where x may be any value from 1 to n), to show correspondence.

The states are reached by state transitions 802 into TD0, 804 from TD0 to TD1, 806_x from TD1 to TD2_x, and 808_x from TD2_x to TD1. The transitions are also labeled with the signal, event, or condition which causes the transition to occur.

A number of control signals are used:
- "Reset": Resets the device;
- "All Lock": Indicates that both Clock sync (Phase Locked Loop clock recovery) and Block Lock (see above) are achieved;
- "Quake Handshake Disable": Disables the handshake (initialization) procedure, and thus precludes the transfer protocol;
- "Quake Part": Determines that the far end transceiver is a (compatible) Quake device;
- "Function x Enable": Command to enable the Quake Feature x;
- "Function x Disable": Command to disable the Quake Feature x; and
- "Function x Complete": Signaling that Quake Feature x has finished, where x is a number from 1 to n.

An event of relevance to the Transmit Features 800 is:

"Receiver enters R2 state": Received from the Receive Handshake 700 of FIG. 7.

The state TD0 (TX Data IDLE) is entered (transition 802 to TD0) when any of the following occur:

the "Reset" signal is or becomes true (device is reset);

the "All Lock" signal is removed (becomes false);

the "Quake Handshake Disable" signal is or becomes true; or the "Quake Part" signal is false, i.e. the receiver has not entered the R2 state (above).

When the "Receiver enters R2 state" event is received from the Receive Handshake 700, confirming the availability of the Extended Link Monitoring Channel, the "Ready to Transmit Data" state TD1 is entered (transition 804).

While in the TD1 state, the Transmit Features 800 waits for commands to enable any of the available features (i.e. Virtual Link Monitoring Channels to carry feature data). An arbitration circuit (not shown) gives fair access to all features in turn when there is contention.

The transition 806x to a corresponding TD2_x state occurs when one of the "Function x Enable" signal becomes active (x=1 to n), for example the "Function 1 Enable" signal triggers the transition 806_1 to the TD2_1 state.

While in the TD2_x state (x=1 to n), the device waits for an Inter Packet Gap IPG 304 (see FIG. 3) to occur, then inserts a Link Monitoring Packet 404 as described above (FIG. 4) to carry data from the current feature. The index of Function codes 516 that are sent in the Q-Start block 406 and Q-Stop block 410 of the Link Monitoring Packet 404 in the TD_x state must be equal to "x", corresponding to the Function "x".

As may frequently happen, the Link Monitoring Packet 404 must be stopped (Q-Stop block 410 inserted) before all required data have been sent. In this case the Function "x" is not complete, and continues to send additional Link Monitoring Packets 404 whenever IPGs 304 are available.

When the Function "x" has finished (signal "Function x Complete"), or when the Function "x" is disabled by the controller (command signal "Function x Disable"), the transition 808_x occurs, returning the Transmit Features 800 to the TD1 state "Ready to Transmit Data".

Receive Features

The Receive Features 900 is shown in a state diagram in FIG. 9.

There are a number of states, an "RX Data IDLE" state RD0, a "Ready to Receive Data" state RD1, and a plurality of "Receiving Data from Function x" states RD2_x where "x" is the index of a Function code 516 ranging from 1 to n (n being the number of available Function codes 516, n=27 in the preferred embodiment).

In the interest of simplifying the description, the variable "x" is used in the names of transitions, states, and functions (where x may be any value from 1 to n), to show correspondence.

The states are reached by state transitions 902 into RD0, 904 from RD0 to RD1, 906_x from RD1 to RD2_x, and 908_x from RD2_x to RD1. The transitions are also labeled with the signal, event, or condition which causes the transition to occur.

A number of control signals are used:

"Reset": Resets the device;

"All Lock": Indicates that both Clock sync (Phase Locked Loop clock recovery) and Block Lock are achieved;

"Quake Handshake Disable": Disables the handshake (initialization) procedure, and thus precludes the transfer protocol; and "Function x Enable": Command to enable the Quake Feature x, where x is a number from 1 to n.

Events of relevance to the Receive Features 900 are:

"Receiver enters R2 state": Received from the Receive Handshake 700 of FIG. 7;

"Function x Start Detected": Triggered when a Q-Start block 406 (FIGS. 4 and 5) with a Function code 516 having the index value "x" is received; and "Function x Stop Detected": Triggered when a Q-Stop block 410 (FIGS. 4 and 5) with a Function code 516 having the index value "x" is received "Control Block Detected": Triggered when any Control block (Sync bits value "01") is received.

The state RD0 (RX Data IDLE) is entered (transition 902 to RD0) when any of the following occur:

the "Reset" signal is or becomes true (device is reset);

the "All Lock" signal is removed (becomes false);

the "Quake Handshake Disable" signal is or becomes true.

When the "Receiver enters R2 state" event is received from the Receive Handshake 700, confirming the availability of the Extended Link Monitoring Channel, the "Ready to Receive Data" state RD1 is entered (transition 904).

While in the RD1 state, the Receive Features 900 is responsive to commands to enable any of the available features (i.e. Virtual Link Monitoring Channels to carry feature data). The "Function x Enable" signals are preferably true by default, enabling all features to be received. Further, while in the RD1 state, the Receive Feature 900 waits for a Q-Start block 406 having any Function code 516 to be detected.

When a Q-Start block 406 with a Function code 516 having the index value "x" is received (the event "Function x Start detected"), the transition 906_x to a corresponding RD2_x state "Receiving Data from Function x" occurs, but only if the "Function x Enable" command is not false (true by default).

While in any of the RD2_x states, the device continues to receive data, in effect receiving a Link Monitoring Data Frame 302.

When the end of the Link Monitoring Data Frame 302 is reached, a Q-Stop block 410 is expected, bearing the same Function code 516 having the index value "x" as the previously received Q-Start block 406.

The detection of a Q-Stop block 410 triggers the transition 908_x from the RD2_x state to the "Ready to Receive Data" state RD1. The command "Function x Disable" also triggers the transition 908_x from the RD2_x state to the RD1 state, canceling the feature even without a Q-Stop block 410 having been received.

If, while in an RD2_x state, a Q-Stop block 410 with an incorrect Function code 516 is detected, or indeed if any Control block, including an IPG block 502, is detected, an error may have occurred and the transition 908_x to the "Ready to Receive Data" state RD1 occurs. Depending on the type of feature "x" the error may be ignored, the received data may be discarded, or other action taken.

PRBS Feature

Bit Error Rate (BER) monitoring using a Pseudo Random Bit Sequence (PRBS) is an example of the application of the Extended Link Monitoring Channel.

It is common practice to generate a PRBS in a transmitting transceiver, and check it in the receiving transceiver of a link, as described above.

The Quake feature "PRBS" may be assigned the Function code (516) index of 1, corresponding to the set of three FCODEs (514) {0x33, 0x33, 0x33}, see FIG. 5.

Once initialization is complete (Transmit Handshake 600 and Receive Handshake 700), indicated by the "Receiver enters R2 state" event, the Extended Link Monitoring Channel is available for use. The "Transmit Features" 800 is now in the state TD1 (Ready to Transmit Data), and the "Receive Features" 900 is in the state RD1 (Ready to Receive Data).

Using the command "Function 1 Enable", the Transmit Features 800 in the transceiver 200 at the transmitting end of a link goes to the state TD2_1, allowing the PRBS generator to send a pseudo random bit sequence in the Channel Data 408 field of a Link Monitoring Packet 404. The Q-Start and Q-Stop blocks 406 and 410 of the Link Monitoring packet 404 have the Function code (516) index value 1.

The PRBS transmission may continue as long as the Inter Packet Gap (IPG) permits, or may be terminated after a predetermined number of bits have been sent.

The Receive Feature 900 in the transceiver 200 at the receiving end of the link is waiting in the state RD1. Assuming the Function 1 is enabled, the Receive Feature 900 will detect the Q-Start block 406, having the Function code 516 index value of 1, and thus enter the state RD2_1 (Receiving Data from Function 1) through the transition 906_1.

While in the state RD2_1, the Channel Data segment 408 with the PRBS is received and may be checked by the BER monitoring feature.

After the end of the Channel Data segment 408 a Q-Stop block 410 is detected and the Receive Feature 900 leaves the RD2_1 state, to return to the RD1 state (transition 908_1) and await another Q-Start block 406, with the same or perhaps a different Function code 516.

The Transmit Features 800 in the transceiver 200 at the transmitting end of a link may continue sending PRBS blocks in successive Link Monitoring Packets 404, whenever Inter Packet Gaps (IGPs) are available, and the Receive Feature 900 in the transceiver 200 at the receiving end of the link may continue to receive and check the received sequences, thus providing exhaustive BER monitoring. The same process may be occurring in both directions of the link simultaneously.

Other Features

The PRBS feature is only one example of a feature that is enabled by the Extended Link Monitoring Channel. The Digital Optical Digital Optical Monitoring (DOM) is another feature. Many other useful features may be conceived, for example a feature to remotely retrieve register values ("read" the registers) from the transceiver at the far end, to monitor, enable, or disable link functions at the far end, and so on.

In general, two nodes interconnected by one or more 10 Gb/s Ethernet links equipped with transceivers 200 that provide the Extended Link Monitoring Channel, are thus enabled to communicate link related information over these links. Similarly, in a communications network comprising such nodes, the availability of the Extended Link Monitoring Channel between network nodes enables the network to monitor its links (using the PRBS and the DOM feature) in a timely and efficient manner.

CONCLUSION

An Extended Link Monitoring Channel has been developed for 10GBASE-R links that provides the capability to transmit information in addition to, and without affecting, the carriage of user data packets. The Extended Link Monitoring Channel can be used to conduct exhaustive BER measurements over the link, transmit the results of Digital Optical Monitoring (DOM), or send any other information. A robust initialization protocol has been developed, along with a method for providing multiple virtual Link Monitoring Channels for a plurality of features.

Through the added functionality provided by the Extended Link Monitoring Channel, the suitability of 10GBASE-R links in an optical network is improved significantly, including the ability to insert and extract link related information, in a way that is compatible with the 10GBASE-R standard protocol.

Although the embodiment of the invention has been described in detail, it will be apparent to one skilled in the art that variations and modifications to the embodiment may be made within the scope of the following claims.

What is claimed is:

1. A transceiver between an Ethernet media access control (MAC) layer device and a 10 Gb/s Ethernet link, comprising:
    a 10 Gigabit attachment unit interface (XAUI) for providing a connection between the transceiver and the Ethernet media access control (MAC) layer device;
    a media dependent interface (MDI) for providing the 10 Gb/s Ethernet link to the transceiver; and
    a physical coding sublayer (PCS) extension circuit for implementing an extended link monitoring channel for said link for communicating link related information during Inter Packet Gaps (IPG) between user data packets, the PCS extension circuit comprising a processor configured with processor-executable instructions to perform operations comprising:
        initializing the extended link monitoring channel by determining Inter Packet Gaps (IPGs) between blocks of user data, substituting selected IPG with ping blocks that are control blocks to be sent to a far end such that only each $(N_1+1)$-th idle block is substituted with the ping block until a total of Nx ping blocks has been substituted, and receiving ping blocks from the far end such that at least $N_R$ ping blocks are separated by no more than $N_J$ idle blocks, $N_R$ are less or equal to $N_X$, and $N_J$ are equal to or greater than $N_J$, wherein $N_J=16$, $N_X=16$, $N_R=8$, $N_J=32$;
        communicating link monitoring information over the extended link monitoring channel by determining Inter Packet Gaps (IPG) between blocks of user data, and substituting, for the extended link monitoring channel, selected Inter Packet Gaps (IPG) with extended link monitoring blocks including blocks to carry link related information and control blocks constructed using selected reserved codes of IEEE 802.3 Ethernet standard; and
        splitting the extended link monitoring channel by multiplexing a number of virtual link monitoring channels over the same link at the physical layer, each of the virtual link monitoring channels intended for communicating a different type of the link related information.

2. The transceiver of claim 1, wherein the processor of the PCS extension circuit is configured with processor-executable instructions to perform operations further comprising:
    processing a 10 Gb/s Ethernet signal in the form of 64B/66B blocks.

3. The transceiver of claim 2, wherein the processor of the PCS extension circuit is configured with processor-executable instructions to perform operations further comprising:
    determining Inter Packet Gaps (IPG) within said Ethernet signal and replacing selected Inter Packet Gaps (IPG) with extended link monitoring blocks; and
    determining extended link monitoring blocks within said Ethernet signal and replacing them with Inter Packet Gaps (IPG).

4. The transceiver of claim 3, wherein the PCS extension circuit is controlled by an external device to initialize the extended link monitoring channel, and to insert and extract the link related information.

5. The transceiver of claim 3, wherein the processor of the PCS extension circuit is further configured with processor-executable instructions to perform operations further comprising:
generating a pseudo-random bit sequence (PRBS) and evaluating a received PRBS to determine a bit error rate (BER) for the link.

6. The transceiver of claim 1, wherein the link is a 10GBASE-R Ethernet link of the IEEE 802.3 Ethernet standard.

7. The transceiver of claim 1, wherein the link is an optical link.

8. A physical coding sublayer (PCS) extension circuit for a 10 Gb/s Ethernet transceiver, providing signal adaptation between an Ethernet media access control (MAC) layer device and a 10 Gb/s Ethernet link, the PCS extension circuit comprising:
a first interface for connecting the PCS extension circuit to a PCS 64B/66B coder circuit;
a second interface for connecting the PCS extension circuit to a PCS scrambler circuit; and
a processor configured with processor-executable instructions to perform operations comprising:
initializing an extended link monitoring channel for the link by determining Inter Packet Gaps (IPGs) between blocks of user data, substituting selected IPG with ping blocks that are control blocks to be sent to a far end such that only each $(N_1+1)$-th idle block is substituted with the ping block until a total of Nx ping blocks has been substituted, and receiving ping blocks from the far end such that at least $N_R$ ping blocks are separated by no more than $N_J$ idle blocks, $N_R$ are less or equal to $N_X$, and $N_J$ are equal to or greater than $N_J$, wherein $N_J=16$, $N_X=16$, $N_R=8$, $N_J=32$;
communicating link monitoring information over the extended link monitoring channel by determining Inter Packet Gaps (IPG) between blocks of user data, and substituting, for the extended link monitoring channel, selected Inter Packet Gaps (IPG) with extended link monitoring blocks including blocks to carry link related information and control blocks constructed using selected reserved codes of IEEE 802.3 Ethernet standard; and
splitting the extended link monitoring channel by multiplexing a number of virtual link monitoring channels over the same link at the physical layer, each of the virtual link monitoring channels intended for communicating a different type of the link related information.

9. The PCS extension circuit of claim 8, wherein the processor is configured with processor-executable instructions to perform operations further comprising:
processing an Ethernet signal in the form of 64B/66B blocks.

10. The PCS extension circuit of claim 9, wherein the processor is configured with processor-executable instructions to perform operations further comprising:
determining idle blocks within the Ethernet signal and replacing selected idle blocks with extended link monitoring blocks; and
determining extended link monitoring blocks within said Ethernet signal and replacing them with idle blocks.

11. The PCS extension circuit of claim 10, wherein the processor is further configured with processor-executable instructions such that the PCS extension circuit is controlled by an external device to initialize the extended link monitoring channel, and to insert and extract the link related information.

12. The PCS extension circuit of claim 10, wherein the processor is further configured with processor-executable instructions to perform operations further comprising:
generating a pseudo-random bit sequence (PRBS); and evaluating a received PRBS for to determine a bit error rate (BER) for the link.

13. The PCS extension circuit of claim 8, wherein the transceiver is designed for a 10GBASE-R Ethernet link of the IEEE 802.3 Ethernet standard.

14. The PCS extension circuit of claim 8, wherein the transceiver is designed for an optical link.

15. A link system in an a 10 Gb/s Ethernet network, comprising at least two nodes connected by a 10 Gb/s Ethernet link, the link system having a transceiver between an Ethernet media access control (MAC) layer device and the 10 Gb/s Ethernet link, the transceiver comprising:
a 10 Gigabit attachment unit interface (XAUI) for providing a connection between the transceiver and the Ethernet media access control (MAC) layer device;
a media dependent interface (MDI) for providing the 10 Gb/s Ethernet link to the transceiver; and
a physical coding sublayer (PCS) extension circuit for implementing an extended link monitoring channel for said link for transmitting link related information during Inter Packet Gaps (IPG) between user data packets, the PCS extension circuit comprising a processor configured with processor-executable instructions to perform operations comprising:
initializing the extended link monitoring channel by determining Inter Packet Gaps (IPGs) between blocks of user data, substituting selected IPG with ping blocks that are control blocks to be sent to a far end such that only each $(N_1+1)$-th idle block is substituted with the ping block until a total of Nx ping blocks has been substituted, and receiving ping blocks from the far end such that at least $N_R$ ping blocks are separated by no more than $N_J$ idle blocks, $N_R$ are less or equal to $N_X$, and $N_J$ are equal to or greater than $N_J$, wherein $N_J=16$, $N_X=16$, $N_R=8$, $N_J=32$;
communicating link monitoring information over the extended link monitoring channel by determining Inter Packet Gaps (IPG) between blocks of user data, and
substituting, for the extended link monitoring channel, selected Inter Packet Gaps (IPG) with extended link monitoring blocks including blocks to carry link related information and control blocks constructed using selected reserved codes of IEEE 802.3 Ethernet standard; and
splitting the extended link monitoring channel by multiplexing a number of virtual link monitoring channels over the same link at the physical layer, each of the virtual link monitoring channels intended for communicating a different type of the link related information.

16. The link system of claim 15, wherein the processor of the PCS extension circuit is configured with processor-executable instructions to perform operations further comprising:
processing an Ethernet signal in the form of 64B/66B blocks by determining idle blocks within the Ethernet signal and replacing selected idle blocks with extended link monitoring blocks; and determining extended link monitoring blocks within the Ethernet signal and replacing them with idle blocks.

17. The link system of claim 16, wherein the processor of the PCS extension circuit is configured with processor-executable instructions to perform operations further comprising:

generating a pseudo-random bit sequence (PRBS) to be sent through said extended link monitoring channel, and evaluating a received PRBS for the purpose of determining a bit error rate (BER) for the link.

18. A method for implementing an extended link monitoring channel for a 10 Gb/s Ethernet link carrying an Ethernet signal in the form of blocks of N bits, the method comprising:

initializing the extended link monitoring channel by determining Inter Packet Gaps (IPGs) between blocks of user data, substituting selected IPG with ping blocks that are control blocks to be sent to a far end such that only each $(N_1+1)$-th idle block is substituted with the ping block until a total of Nx ping blocks has been substituted, and receiving ping blocks from the far end such that at least $N_R$ ping blocks are separated by no more than $N_J$ idle blocks, $N_R$ are less or equal and $N_X$, and $N_J$ are equal to or great than $N_J$, wherein $N_J=16$, $N_X=16$, $N_R=8$, $N_J=32$;

communicating link monitoring information over the extended link monitoring channel by determining Inter Packet Gaps (IPG) between blocks of user data, and substituting, for the extended link monitoring channel, selected Inter Packet Gaps (IPG) with extended link monitoring blocks including blocks to carry link related information and control blocks constructed using selected reserved codes of IEEE 802.3 Ethernet standard; and splitting the extended link monitoring channel by multiplexing a number of virtual link monitoring channels over the same link at the physical layer, each of the virtual link monitoring channels intended for communicating a different type of the link related information.

19. The method of claim 18, the method being performed for the Ethernet signal in the form of blocks of 66 bits according to the IEEE 802.3 Ethernet standard for 10GBASE-R Ethernet links.

20. The method of claim 18, wherein substituting selected IPG blocks with ping blocks comprises substituting with ping blocks constructed with such selected reserved codes of the IEEE 802.3 Ethernet standard that, when received by a transceiver at the far end which lacks the PCS extension circuit, the ping blocks will not be recognized and interpreted as if they were idle blocks of the standard.

21. The method of claim 18, wherein substituting selected IPG blocks with extended link monitoring blocks comprises substituting each of the selected IPG blocks with one of the following types of the extended link monitoring blocks: a Q-start block; a channel data block; and a Q-stop block, wherein the Q-start block and Q-stop block are control blocks, and the channel data block carries the link related information.

22. The method of claim 21, wherein substituting the selected IPG blocks comprises substituting the selected IPG blocks with a sequence of the Q-start block, zero or more of the channel data blocks, and the Q-stop block, the sequence forming a link monitoring packet.

23. The method of claim 21, wherein substituting with the Q-start block comprises substituting with the Q-start block having an identifier for a virtual link monitoring channel within the extended link monitoring channel, the virtual link monitoring channel communicating a specific type of the link related information.

24. The method of claim 23, wherein the link related information is one or more of the following: a pseudo random bit sequence (PRBS) for bit error rate measurement; data from a digital optical monitoring (DOM) subsystem for monitoring optical link parameters; information contained in registers of the PCS devices; and link states and alarms.

25. A system for implementing an extended link monitoring channel for a 10 Gb/s Ethernet link carrying an Ethernet signal in the form of blocks of N bits, the system comprising:

means for initializing the extended link monitoring channel by determining Inter Packet Gaps (IPGs) between blocks of user data, substituting selected IPG with ping blocks that are control blocks to be sent to a far end such that only each $(N_1+1)$-th idle block is substituted with the ping block until a total of Nx ping blocks has been substituted, and receiving ping blocks from the far end such that at least $N_R$ ping blocks are separated by no more than $N_J$ idle blocks, $N_R$ are less or equal to $N_X$, and $N_J$ are equal to or greater than $N_J$, wherein $N_J=16$, $N_X=16$, $N_R=8$, $N_J=32$;

means for communicating link monitoring information over the extended link monitoring channel by determining Inter Packet Gaps (IPG) between blocks of user data, and substituting, for the extended link monitoring channel, selected Inter Packet Gaps (IPG) with extended link monitoring blocks including blocks to carry link related information and control blocks constructed using selected reserved codes of IEEE 802.3 Ethernet standard; and means for splitting the extended link monitoring channel by multiplexing a number of virtual link monitoring channels over the same link at the physical layer, each of the virtual link monitoring channels intended for communicating a different type of the link related information.

26. The system of claim 25, further comprising:

means for processing the Ethernet signal in the form of blocks of 66 bits according to the IEEE 802.3 Ethernet standard for 10GBASE-R Ethernet links.

27. The system of claim 25, wherein means for initializing the extended link monitoring channel comprises means for substituting selected IPG blocks with ping blocks constructed with such selected reserved codes of the IEEE 802.3 Ethernet standard such that, when received by a transceiver at the far end which lacks the PCS extension circuit, the ping blocks will not be recognized and interpreted as if they were idle blocks of the standard.

28. The system of claim 25, wherein means for initializing the extended link monitoring channel comprises means for substituting each of the selected IPG blocks with one of the following types of the extended link monitoring blocks: a Q-start block; a channel data block; and a Q-stop block, wherein the Q-start block and Q-stop block are control blocks, and the channel data block carries the link related information.

29. The system of claim 28, wherein means for substituting each of the selected IPG blocks comprises means for substituting the selected IPG blocks with a sequence of the Q-start block, zero or more of the channel data blocks, and the Q-stop block, such that the sequence forms a link monitoring packet.

30. The system of claim 28, wherein means for substituting each of the selected IPG blocks comprises means for substituting with a Q-start block having an identifier for a virtual link monitoring channel within the extended link monitoring channel, the virtual link monitoring channel communicating a specific type of the link related information.

31. The system of claim 25, wherein means for communicating link monitoring information comprises means communicating link related information that is one or more of the following: a pseudo random bit sequence (PRBS) for bit error rate measurement; data from a digital optical monitoring (DOM) subsystem for monitoring optical link parameters; information contained in registers of the PCS devices; and link states and alarms.

* * * * *